United States Patent [19]

Yamada et al.

[11] 4,263,633
[45] Apr. 21, 1981

[54] COMBINED MAGNETIC TAPE HEAD

[75] Inventors: Yozo Yamada; Kazuo Hayashi, both of Tokorozawa; Heihachiro Kobayashi, Chichibu, all of Japan

[73] Assignee: Pioneer Electronic Corporation, Tokyo, Japan

[21] Appl. No.: 40,373

[22] Filed: May 18, 1979

[30] Foreign Application Priority Data

May 18, 1978 [JP] Japan .................................. 53/58283
Jul. 6, 1978 [JP] Japan ........................... 53/92294[U]

[51] Int. Cl.³ .......................... G11B 5/22; G11B 5/10; G11B 5/27
[52] U.S. Cl. .................................... 360/129; 360/121; 360/122
[58] Field of Search ............... 360/129, 122, 121, 125, 360/128, 119, 124, 102–103, 130.2

[56] References Cited

U.S. PATENT DOCUMENTS

| | | | |
|---|---|---|---|
| 2,885,488 | 5/1959 | Andrews | 360/121 |
| 3,249,928 | 5/1966 | Curtis et al. | 360/129 |
| 3,252,153 | 5/1966 | Mos | 360/128 |
| 3,479,737 | 11/1969 | Hinlein | 360/121 |
| 3,551,609 | 12/1970 | Libby et al. | 360/122 |
| 3,806,902 | 4/1974 | Drees et al. | 360/121 |

*Primary Examiner*—Alfred H. Eddleman
*Attorney, Agent, or Firm*—Sughrue, Rothwell, Mion, Zinn and Macpeak

[57] ABSTRACT

A combined magnetic tape head having a recording head and a reproducing head disposed in a side by side relationship with a recessed wedge shaped area therebetween. A shielding plate is interposed between the heads to reduce cross feed therebetween. The top portion of the shielding plate is bent into L-shape so that the bent tip confronts the recording head. The remainder of the wedge shaped area is covered with a resin material, or an auxiliary plate can be positioned over the plate extending between the heads. In order to maintain the combined head free from dust accumulation, the top portion of the L-shaped shielding plate or the auxiliary plate is tapered so that it has a substantially trapezoidal cross-section with either straight or curved inclining sides.

9 Claims, 11 Drawing Figures

COMBINED MAGNETIC TAPE HEAD

BACKGROUND OF THE INVENTION

This invention relates generally to an improvement of a combined magnetic head for use in a tape recorder.

Conventionally known combined magnetic heads are shown in FIGS. 1(A) and 1(B) and FIGS. 2(A) and 2(B). FIGS. 1(A) and 1(B) are a plane view and a front view, respectively, showing one example of the combined magnetic head, wherein a magnetic tape (not shown) tightly contacts and slidingly travels past tape sliding surfaces $1b$ and $2b$. The combined magnetic head has two head units 1 and 2 [FIG. 1(B)], with the head unit 1 including a magnetic core $1a$ and tape sliding surface $1b$ while the head unit 2 includes a magnetic core $2a$ and tape sliding surface $2b$. These two head units 1 and 2 are magnetically shielded by a shielding plate 3. The head units 1 and 2 and the shielding plate 3 are accommodated into a single head case, thereby forming the combined magnetic head.

FIGS. 2(A) and 2(B) are a plane view and a front view, respectively, showing another example of a prior art combined magnetic head, wherein the magnetic tape slidingly contacts and travels past tape sliding surfaces $5b$ and $6b$. The combined magnetic head has two head units 5 and 6 [FIG. 2(B)], with the head unit 5 including a magnetic core $5a$ and tape sliding surface $5b$ while the head unit 6 includes a magnetic core $6a$ and tape sliding surface $6b$. The head units 5 and 6 are accommodated into the respective head cases $5c$ and $6c$. These two head cases $5c$ and $6c$ adjoin each other and are combined to form the combined magnetic head.

While the advantages of a combined magnetic head are well known, for example, the running distance of the magnetic tape is shortened, the tape running is stabilized, and adjustment of installing respective heads is unnecessary because they are integrally formed and can be treated in the same manner as in the case of a single magnetic head, it's disadvantages such that at the time of simultaneous monitoring, a signal of a recording head interfers a reproducing signal of a reproducing head, i.e. so-called "cross feed" phenomena, are equally appreciated.

The combined magnetic head as shown in FIGS. 1(A) and 1(B) is advantageous in that it prevents cross feed. According to this structure, however, the relationship between the configuration of the cores $1a$ and $2a$ and the contact of the magnetic tape thereto is degraded resulting that frequency response curves at the region of less than 1 KHz become corrugated and thus contour characteristics are degraded.

On the other hand, the magnetic head shown in FIGS. 2(A) and 2(B) is advantageous in terms of contour characteristics whereas it is disadvantageous in terms of cross feed as compared with the magnetic head shown in FIGS. 1(A) and 1(B). Further, stable tape running cannot be achieved per se according to the magnetic head shown in FIGS. 2(A) and 2(B), especially in a cassette tape recorder in which a tape pressure pad is employed, since a recessed wedge shaped portion is formed at the center of the tape sliding surfaces $5b$ and $6b$. Specifically, due to scattering of the tape pressure pad in its pressing force (i.e. the force is not uniformly applied), rattling of the fixed portions of the pressure pad and the difference in the pad material, the magnetic tape vibrates in directions indicated by arrows 8 when the tape travels past the heads. Hence, the contact of the magnetic tape to the sliding surfaces $5b$ and $6b$ becomes unstable. If the contact of the magnetic tape to the sliding surfaces of the magnetic head becomes unstable, various kinds of unwanted losses, such as tracking loss, azimuth loss, etc. are increased. As a result, an electro-magnetic conversion would be implemented in a distorted fashion with the attendant loss of sound reproduction.

In order to reduce or eliminate the above-mentioned losses, it has been proposed to employ and auxiliary plate 9 whose cross-section is rectangular as shown in FIG. 3. The auxiliary plate 9 is provided so that both ends thereof are adjacent to the tape sliding surfaces $5b$ and $6b$ covering the wedge shaped open portion. The auxiliary plate 9 is made of non-magnetic material or soft magnetic material and is fixed to the head units 5 and 6 by an adhesion agent 10, such as an epoxy resin or the like. An improved structure and arrangement of the auxiliary plate is shown in FIG. 7 of co-pending application Ser. No. 957,503.

The condition of stable tape running can be achieved by contacting the magnetic tape not only to the sliding surfaces $5b$ and $6b$ but also to the sliding surface $9b$ of the auxiliary plate 9. As a result, the above-mentioned unwanted losses are reduced. However, it is still disadvantageous in that the tape tends to be damaged or injured and dust accumulates in the side portions $9a$ of the auxiliary plate 9. This is due to the fact that an angle $\theta_1$ defined by the side edge $9a$ of the auxiliary plate 9 and the tape sliding surface $9b$ thereof is approximately 90°.

SUMMARY OF THE INVENTION

Accordingly, it is an object of this invention to provide an improved combined tape head that reduces cross feed without degrading the contour characteristic.

It is another object of this invention to provide an improved tape head that reduces the accumulation of dust.

Still another object of this invention is to provide for an improved magnetic tape head that overcomes the deficiencies of the prior art and offers improved performance.

These and other objects of this invention are accomplished in a combined magnetic tape head having a recording head and a reproducing head disposed in a side relationship with a recessed wedge shaped area therebetween. A shielding plate is interposed between the heads to reduce cross feed therebetween. The top portion of the shielding plate is bent into L-shape so that the bent tip confronts the recording head. The remainder of the wedge shaped area is covered with a resin material, or an auxiliary plate can be positioned over the plate extending between the heads. In order to maintain the combined head free from dust accumulation, the top portion of the L-shaped shielding plate or the auxiliary plate is tapered so that it has a substantially trapezoidal cross-section with either straight or curved inclining sides.

DETAILED DESCRIPTION OF THE PREFERRED EMBODIMENTS

Various embodiments according to the present invention will now be described referring to the accompanying drawings.

Figure 1A:
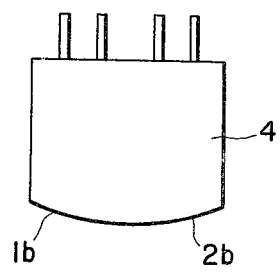
FIG. 1(A) is a plan view showing one example of a conventional combined magnetic head.
Figure 2A:
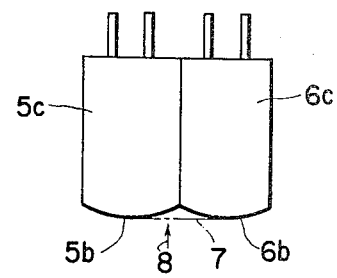
FIG. 2(A) is a plan view showing another example of a conventional combined magnetic head.
Figure 1B:
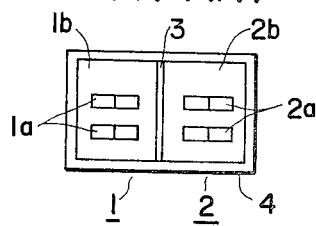
FIG. 1(B) is a front view of the combined magnetic head shown in FIG. 1(A)
Figure 2B:
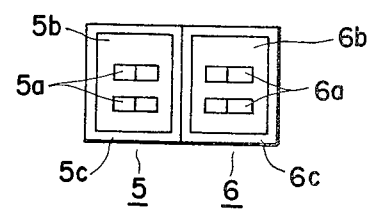
FIG. 2(B) is a front view of the combined magnetic head shown in FIG. 2(A)
Figure 3:
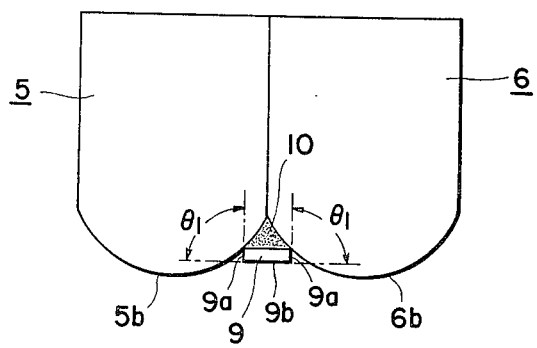
FIG. 3 is a plan view of a combined magnetic head in which a conventional auxiliary plate is employed.
Figure 4:
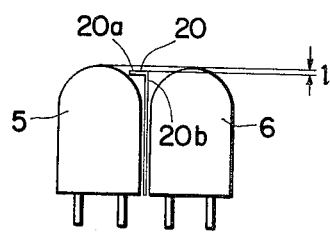
FIG. 4 is a view of an outer configuration showing a first embodiment of the combined magnetic head according to the present invention.

Referring to FIG. 4, a shielding plate 20 is provided between magnetic head units 5 and 6, which is made of a soft magnetic material, such as Permalloy, and whose top portion is bent into L-shape so that the bent tip 20a confronts the head unit 5 without contacting thereto, and the shaft portion 20b extends between the two heads. The head unit 5 is a recording head. The reason that the bent tip 20a of the L-shaped shielding plate 20 faces toward the recording head is that if the shielding plate has access to the reproducing core, a magnetic circuit is formed therebetween. Unwanted signals are then picked up in the reproducing head. This has been proved by experimental results.

Figure 6:
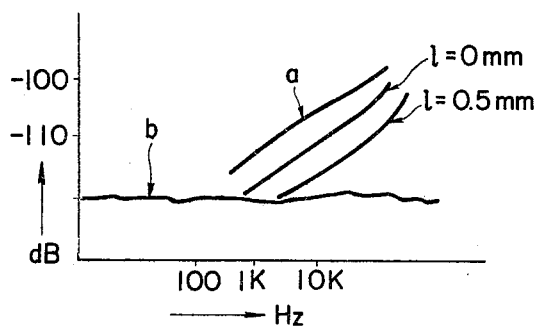
FIG. 6 is a graphical representation of the amount of the "cross feed" as a function of distance.

The amount of cross feed is graphically represented in FIG. 6 in the case where the distance λ between the upper surface of the L-shaped shielding plate 20 and the top portion of the head unit 6 (reproducing head) is changed. In this case, Permalloy is used for the shielding plate. According to this graph, it can be appreciated that the cross feed is preferable in the case of λ=0 to 0.5 mm. In FIG. 6, the curve a represents a characteristic in the cases not employing the shielding plate 20 and the curve b is a noise level.

Figure 5:
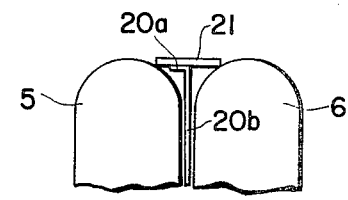
FIG. 5 is a view of an outer configuration showing a second embodiment of the combined magnetic head shown in FIG. 3.

Since the magnetic tape moves in slidingly contact with the front surfaces of the heads, an auxiliary plate 21 may be employed as shown in FIG. 5 to prevent abrasion, bending of the shielding plate 20. Alternatively, a non-magnetic resin is impregnated in the open areas.

Figure 7A:
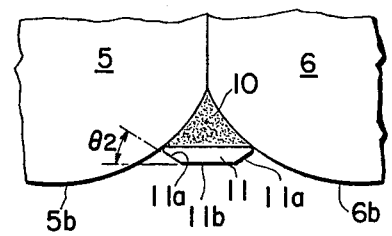
FIG. 7(A) is a plan view showing the first modification according to the present invention.

FIG. 7(A) is a plan view showing an example of the auxiliary plate 11 which is provided between the tape sliding surfaces 5b and 6b of the head units 5 and 6, respectively. The auxiliary plate 11 corresponding to plate 21 of FIG. 5 is made of non-magnetic material or soft magnetic material such as Permalloy, and whose cross-section is in the shape of approximate trapezoid. By an adhesion agent 10, such as an epoxy resin or the like, the auxiliary plate 11 is fixedly secured to the magnetic head units 5 and 6. A contact angle $\theta_2$ of the auxiliary plate 11 defined by a side surface 11a and a tape sliding surface 11b is set to be equal to or less than 35°.

Figure 7B:
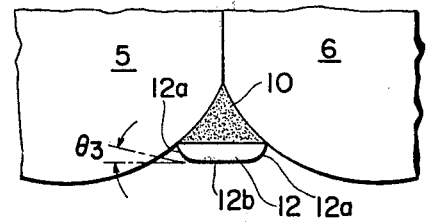
FIG. 7(B) is a plan view showing the second modification according to the present invention.

FIG. 7(B) is a plan view showing the other example of the auxiliary plate 12 corresponding to plate 21 of FIG. 5, the both side portions 12a of which are curved inwardly. Although the angle of the side portions with respect to the tape sliding surface 12b is not definitely determined due to a continuous curvature, the contact angle $\theta_3$ can be regarded approximately as 0°.

The auxiliary plates 11 and 12 shown in FIGS. 7(A) and 7(B) are such that the contact angle is set within the range of 0° to 35°.

Figure 8:
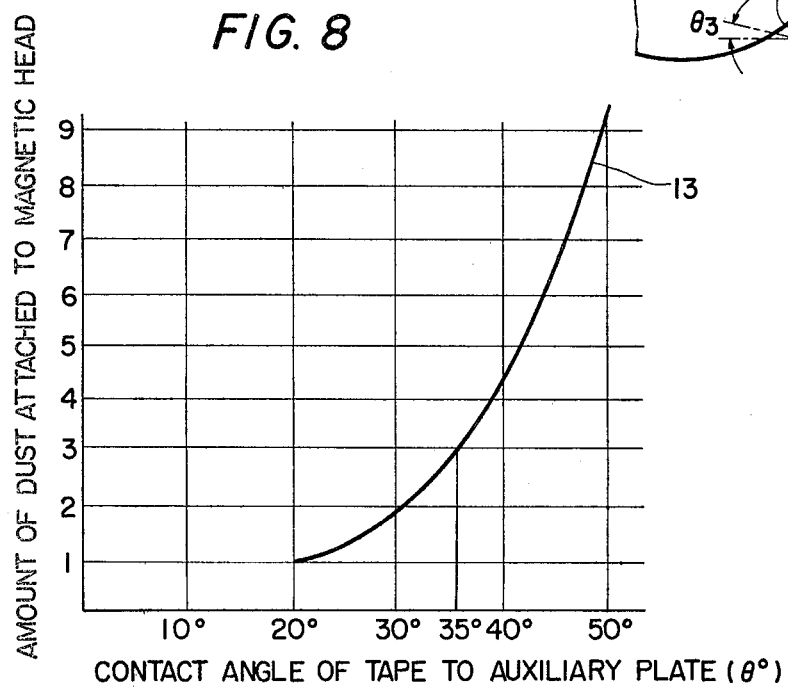
FIG. 8 is a graph showing a relationship between the amount of dust attached to the magnetic head and the contact angle $\theta$.

FIG. 8 is a graph showing the relationship between the contact angle $\theta$ and the amount of dust accumulated in the magnetic head. The latter is plotted in the axis of the ordinate by way of a ratio which is determined so that the amount of dust accumulated therein is 1 when the contact angle $\theta$ is zero. The magnetic tape used is Philips type tape and is run at the speed of 4.75 cm/sec for a period of 100 hours. As can be appreciated from the resultant curve, since the permissible amount of dust accumulated therein is predetermind to be less than 3, the appropriate contact is in the range of 0° to 35°.

Thus, according to this embodiment, the amount of cross feed is reduced without degrading the contour characteristic.

It is apparent that modifications of this invention can be made without departing from the scope thereof. For example, the bent portion of the L-shaped shielding plate shown in FIG. 4 can be tapered as shown in FIGS. 7(A) or 7(B) to eliminate dust build up. In this case, the auxiliary plate may be omitted.

What is claimed is:

1. In a combined magnetic head having a pair of recording and reproducing heads, each having an arcuate tape sliding surface and a recess therebetween, the improvement comprising an L-shaped shielding member extending between said heads in said recess and having a tip portion bent in the direction of said recording head.

2. The tape head as claimed in claim 1 wherein said tip portion is recessed a distance below a tangent line extending between said arcuate tape sliding surfaces, said distance in the range of 0 to 0.5 mm.

3. The tape head as claimed in claims 1 or 2 further comprising an auxiliary plate positioned on said tip portion and extending across said recess and having a flat sliding surface.

4. The tape head as claimed in claim 3 further comprising a resin material disposed in said recess.

5. The tape head as claimed in claim 3 wherein said auxiliary plate has tapered side surfaces extending inward from said arcuate tape sliding surfaces to said flat sliding surface.

6. The tape head as claimed in claim 5 wherein said tapered side surfaces are flat and said auxiliary plate is substantially trapezoidal in cross-section.

7. The tape head as claimed in claim 5 wherein said tapered side surfaces are curved inwardly from said arcuate tape sliding surface to said flat sliding surface.

8. The tape head as claimed in claim 5 wherein said flat sliding surface and said tapered surface defines a contact angle $\theta$, and $\theta$ is in the range of 0° to 35°.

9. The tape head as claimed in claim 5 further comprising resin material disposed in said recess.

* * * * *

UNITED STATES PATENT AND TRADEMARK OFFICE
CERTIFICATE OF CORRECTION

PATENT NO. : 4,263,633
DATED : April 21, 1981
INVENTOR(S) : Yozo Yamada, Kazuo Hayashi, and Heihachiro Kobayashi It is certified that error appears in the above-identified patent and that said Letters Patent are hereby corrected as shown below:

Please correct the Assignee to read

-- Pioneer Electronic Corporation and Canon Electronics Co., Ltd. --

Signed and Sealed this

Eleventh Day of August 1981

[SEAL]

Attest:

GERALD J. MOSSINGHOFF

Attesting Officer    Commissioner of Patents and Trademarks